United States Patent
Mitchell et al.

(10) Patent No.: US 6,504,151 B1
(45) Date of Patent: Jan. 7, 2003

(54) WEAR COATING APPLIED TO AN ATOMIC FORCE PROBE TIP

(75) Inventors: Thomas Owen Mitchell, Redwood City, CA (US); Andreas Berghaus, San Francisco, CA (US)

(73) Assignee: FEI Company, Hillsboro, OR (US)

( * ) Notice: Subject to any disclaimer, the term of this patent is extended or adjusted under 35 U.S.C. 154(b) by 135 days.

(21) Appl. No.: 09/660,654

(22) Filed: Sep. 13, 2000

(51) Int. Cl.[7] .................. G01N 23/00; G21K 7/00; G01B 5/28
(52) U.S. Cl. ........................... 250/306; 73/105
(58) Field of Search .................. 250/310, 306

(56) References Cited

U.S. PATENT DOCUMENTS

| | | | |
|---|---|---|---|
| 5,480,049 A | * 1/1996 | Marchman | 216/24 |
| 5,611,942 A | * 3/1997 | Mitsui et al. | 216/11 |
| 5,751,683 A | * 5/1998 | Kley | 250/310 |
| 5,877,412 A | * 3/1999 | Muramatsu et al. | 73/105 |
| 6,252,226 B1 | * 6/2001 | Kley | 250/306 |
| 6,268,608 B1 | * 7/2001 | Chandler | 250/492.2 |
| 6,281,491 B1 | * 8/2001 | Kley | 250/234 |
| 6,339,217 B1 | * 1/2002 | Kley | 250/216 |
| 6,358,426 B1 | * 3/2002 | Muramatsu et al. | 216/11 |

\* cited by examiner

*Primary Examiner*—Jack Berman
*Assistant Examiner*—Johnnie L Smith, II
(74) *Attorney, Agent, or Firm*—Michael O. Scheinberg; David Griner

(57) ABSTRACT

A probe tip manufactured from a conically shaped quartz tip etched to a fine apex. The quartz tip is coated with about 1 $\mu$m of a hard material such as silicon nitride. A probe tip having dimensions of about 100 nm×1 $\mu$m is then machined from the hard material adjacent to the apex of the quartz tip along the axis of the quartz tip. The machining is preferably performed by focused ion beam milling.

40 Claims, 1 Drawing Sheet

WEAR COATING APPLIED TO AN ATOMIC FORCE PROBE TIP

FIELD OF THE INVENTION

The invention relates generally to mechanical probe tips such as those used in atomic force microscopy. In particular, the invention relates to a composite probe tip having a surface coating overlying a base member.

BACKGROUND ART

Atomic force microscopes (AFMs) have been recently developed for mechanically profiling small features, for example, determining critical dimensions (CDs) of via holes in semiconductor integrated circuits. Such holes have depths of about 1 µm and widths which are being pushed to 180 nm and below. An exceedingly fine probe tip is disposed on the ends of cantilever. In the pixel mode of operation, the probe tip is successively positioned at points on a line above and traversing the feature being probed. The cantilever lowers the probe tip until it encounters the surface, and both the horizontal position and the vertical position at which the probe meets the surface are recorded. A series of such measurements provides the desired microscopic profile. An example of such an atomic force microscope is the Stylus Nanoprobe SNP available from Surface/Interface, Inc. of Sunnyvale, Calif. It employs technology similar to the rocking balanced beam probed disclosed by Griffith et al. in U.S. Pat. No. 5,307,693 and by Bryson et al. in U.S. Pat. No. 5,756,887. Mitchell et al. describe more details of the SNP type of AFM in U.S. patent application Ser. No. 09/354,528, filed Jul. 15, 1999 and incorporated herein by reference in its entirety.

This and other types of AFMs have control and sensing elements more than adequate for the degree of precision required to profile a 180 nm×1 µm hole, as required for many present day integrated circuits. However, the probe tip presents a challenge for profiling the highly anisotropic holes desired in semiconductor fabrication as well as for other uses such as measuring DNA strands and the like. The probe tip needs to be long, narrow, and stiff. Its length needs to at least equal the depth of the hole being probed, and its width throughout this length needs to be less than the width of the hole. A fairly stiff probe tip reduces the biasing introduced by probe tips being deflected by a sloping surface.

One popular type of probe tip is a conically shaped silica tip. It is shaped by a method similar to that used for fabricate a cylindrically shaped probe tip, as described by Marchman in U.S. Pat. No. 5,395,741 and 5,480,049 and by Filas and Marchman in U.S. Pat. No. 5,703,979. For the conically shaped probe tip, a thin silica fiber having a diameter of, for example, 125µm, is lowered through the interface of a thin layer of oil overlying a liquid etchant such as hydrofluoric acid and left there for a sufficient time that a generally conical tip is formed at the fiber end. The etching time is longer than that used for forming Marchman's cylindrical tips. Tips made from silica ($SiO_2$) or other glasses having nearly this composition are usually referred to as being composed of quartz. The tip manufacturing described by Marchman is relatively straightforward, and the larger fiber away from the tip provides good mechanical support for the small tip to be mounted on a beam or cantilever of the profilometer. However, it is difficult to obtain the more desirable cylindrical probe tip of his method. Furthermore, silica is relatively soft so that its lifetime is limited because during use it is being repetitively forced against a relatively hard substrate. Also, silica has a relatively low value of 73 GPa for its Young's modulus, which determines the stiffness of the probe. Very narrow probes tend to flex when they encounter sloping surfaces. Flexing also occurs when very narrow probes are attracted to sidewalls due to electrostatic charging or capillary action in a humid environment. Such flexing should be minimized to enhance the resolution of the AFM or other instrument using the probe.

Mitchell et al. in the above cited patent application disclose a micromachined microprobe in which the probe tip is fabricated using standard deposition and etching processes common in the integrated circuit industry. They favor depositing a thin layer of silicon nitride on a silicon substrate, photolithographically defining the probe width into the silicon nitride layer, and etching away part of the substrate underlying the silicon nitride probe tip. Silicon nitride has a Young's modulus of 270 GPa so it provides a much stiffer probe.

However, the photolithographic resolution required to define the very narrow width of the micromachined microprobe of Mitchell et al. inevitably needs to be slightly better than that being used in the most advanced integrated circuits being developed and tested by the microprobe. As a result, Mitchell et al. suggest fabricating a micromachined microprobe with a significantly wider width than that desired and then reducing its width with focused ion beam (FIB) milling. FIB milling is capable of resolutions of 7 nm, which is satisfactory for most present probe requirements. FIB tools are commercially available.

Although the micromachined microprobe shows promise, it requires development of a new technology to replace the quartz probe tips of Marchman, which are widely accepted and inexpensive but subject to excessive wear and flexing.

FIB milling could be also used to mill very small probe tips from larger bodies of sapphire or diamond. However, FIB milling while effective at milling small areas becomes tedious and expensive when applied to removing large amounts of material.

Accordingly, a probe tip is desired which is both inexpensive but is more resistant to wear than is quartz. Further, a probe tip is desired which is stiffer than one composed of quartz.

SUMMARY OF THE INVENTION

The invention may be summarized as a probe tip formed from a generally conical quartz tip which is isotropically coated with a thin layer of wear resistant material. The coating thickness may range between 100 nm to 10 µm, preferably between 500 nm to 5 µm, and most preferably between 1 and 2 µm. The wear resistant material may be silicon nitride, alumina, diamond, or carbides such as silicon carbide among other possibilities. The wear resistant material is then milled, for example, by focused ion milling (FIB), to form a probe tip.

The machined probe tip may have a cylindrical or square cross section, among other possibilities.

DETAILED DESCRIPTION OF THE PREFERRED EMBODIMENTS

The invention includes a probe tip formed on a quartz tip which is coated with a wear resistant layer, which in turn is machined to form a narrow probe tip. A quartz tip 10 illustrated in the cross-sectional view of FIG. 1 may be formed by adapting the Marchman technique. An end of 125 $\mu$m-diameter quartz (silica) optical fiber is placed in a bath of hydrofluorice acid (HF) overlaid by a thin layer of oil and left in that position for a sufficiently long period that the fiber end is etched to a point. Ideally, the tip 10 is the shape of a cone terminating in a sharp apex 12. The interior apex angle $\theta$ of the cone is preferably relatively small, for example, between 10 and 35°, but angles up to 120° may be used with some limitation on use of the probe. Smaller angles are disadvantageous because the resulting structure is too flexible and the coating to be described below becomes more difficult. Furthermore, the shape of the quartz tip need not be strictly conical and need not end in a very sharp apex 12. The quartz tip needs to taper to an apex having a lateral dimension not greatly larger than the desired probe tip, for example, less than a factor of ten greater.

Figure 2:
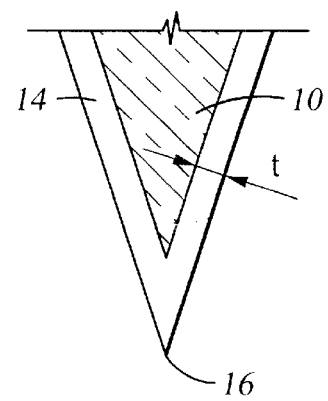
FIG. 2 is a cross-sectional view of the quartz tip coated with a layer of wear resistant material.

As illustrated in FIG. 2, a layer 14 of a wear resistant material is coated on the quartz tip 10 in a generally conformal deposition process. The thickness t of the wear resistant layer should be in the range of 100 nm to 10 $\mu$m, preferably 500 nm to 5 $\mu$m, and most preferably 1 to 2 $\mu$m. Although, the wear resistant layer 14 is illustrated as terminating in a very sharp apex 16, it need not be so sharp.

Figure 3:
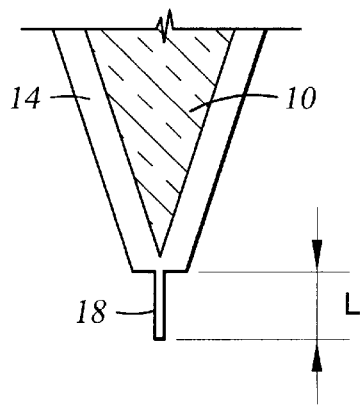
FIG. 3 is a cross-sectional view of a probe tip machined into the layer of wear resistant material.

Then, as illustrated in the cross-sectional view of FIG. 3, a probe tip 18 is machined into the wear resistant layer 14. Preferably, the machining is performed by focused ion beam (FIB) milling.

The wear resistant material should be tougher than quartz and preferably be stiffer than quartz. Values of Young's modulus of elasticity are listed in TABLE 1 for both quartz (fused silica) and other materials usable as the wear resistant layer over quartz. Deposition processes are known for all these materials.

TABLE 1

|  | Young's Modulus (GPa) |
| --- | --- |
| Fused Silica | 73 |
| Silicon | 170 |
| Silicon Nitride | 270 |
| Sapphire | 345 |
| Silicon Carbide | 466 |
| Diamond | 1000 |

In general, toughness increases with stiffness.

Silicon deposited in the form of polysilicon affords some improvements over quartz and can be easily coated, for example, by chemical vapor deposition (CVD) from a silane precursor, such as $SiH_4$. However, the polycrystalline form of silicon is disadvantageous because it the crystal boundaries introduce a failure mechanism in repetitive use. It is more preferred that the silicon be deposited in amorphous form.

Silicon nitride ($Si_3N_4$ or more generally $SiN_x$ with $1<x<1.5$) is significantly stronger than silicon, and many methods are well known for depositing it. It may be deposited in amorphous form by CVD using silane and ammonia ($NH_3$) as precursors.

Sapphire, which is $\alpha$-phase alumina or $Al_2O_3$, is even stronger. Vapor phase deposition of alumina has been described by Glass Jr. et al. in "Chemical vapor deposition precursor chemistry: 2. Formation of pure aluminum, alumina, and aluminum boride thin films from boron-containing precursor compounds by chemical vapor deposition," *Chemical Materials*, vol. 3, no. 4, 1992, pp. 530–538, by Täschner et al. in "Deposition of hard crystalline $Al_2O_3$ coatings by pulsed d.c. PACVD," *Surface and Coatings Technology*, vols. 116–119, 1999, pp. 891–897, and by Pulver et al. in "CVD of $ZrO_2$, $Al_2O_3$ and $Y_2O_3$ from metalorganic compounds in different reactors," *Surface and Coating Technology*, vol. 125, 2000, pp. 400–406.

Silicon carbide (SiC) is one of several carbides such as tungsten carbide (WC) and boron carbide ($B_4C$) exhibiting high strength and hardness. CVD and molecular beam epitaxy (MBE) deposition techniques are available for silicon carbide and boron carbide.

Diamond, that is, tetrahedrally bonded crystalline carbon, is a very hard and strong material, but its crystallinity is disadvantageous for coating sharply pointed shapes because of the inevitable grain boundaries. It is instead preferred that the carbon layer be deposited as amorphous carbon (a-C). Baldwin et al. describe a preferred deposition technique for amorphous carbon in "Deposition processes utilizing a new filtered cathodic arc source," *38th Annual Technical Conference*, Society of Vacuum Coaters, ISSN 0737-5921, 1995, pp. 309–316. Such a cathodic arc source is the CAF-38 available from Commonwealth Scientific Corporation of Alexandria, Va.

Yet other materials such as chromium or nickel may be used for the wear resistant material as long as they have a modulus of elasticity greater than the 73 GPa of quartz and can be coated in thin layers.

The probe tip 18 is preferably machined into the desired form by focused ion beam (FIB) milling. An FIB milling machine produces a very narrow (7 nm) beam of, for example, gallium ions which can mill sharp, 5 nm edges. Automated FIB machines have been developed for milling of recorder heads, and one such machine, Model 200 TEM, is commercially available from FEI, Inc. of Hillsboro, Oreg. For FIB machine of diamond or amorphous carbon, methods of enhancing the FIB milling of diamond or amorphous carbon are disclosed by Stark et al. in "$H_2O$ enhanced focused ion beam micromachining," *Journal of Vacuum Science and Technology B*, vol. 13, no. 6, Nov/Dec 1995, pp. 2565–2569 and by Russell et al. in "Chemically and geometrically enhanced focused ion beam micromachining," *Journal of Vacuum Science and Technology B*, vol. 16, no. 4, July/August 1998, 2494–2498.

The machined probe tip 18 preferably has a cylindrical, rectangular, or square cross section with a lateral dimension less than that of the feature being probed by the AFM. A lateral dimension of 100 nm or less is required for advanced integrated circuit fabrication at this time. The length L of the machined probe tip 18 should be somewhat longer than the depth of the feature being probed, for example, about 1 $\mu$m.

The FIB milling should extend only into the wear resistant material and should leave enough of the wear resistant material on top of the quartz probe near its apex to provide adequate support between the unpatterned coating on the side and the machined probe tip 18. Assuming the simple geometry of FIG. 3, the minimum thickness $t_{min}$ of the wear resistant coating 14 should be somewhat greater than that determined by the equation $$\frac{t_{min}}{L} = \sin\frac{\theta}{2}.$$

For the illustrated cone angle θ of 25° and a length L of 2μm, the minimum coating thickness $t_{min}$ is somewhat greater than 400 nm. A thickness t of greater than 500 nm or preferably greater than 1 μm provides a margin of error and assurance of continuity between the sides and machined parts of the wear resistant material. Excessive thickness should be avoided because the tip 16 of the coated layer tends to round at greater thicknesses and excessive FIB machining is then required to allow the probe to clear surrounding structure on the surface being probed.

Figure 4:
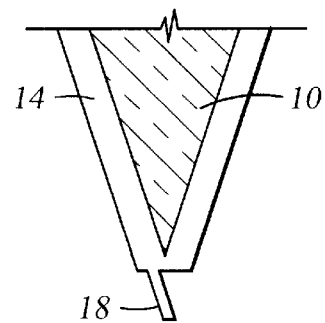
FIG. 4 is a cross-sectional view of another embodiment of a probe tip inclined with respect to the fiber axis.

Although the machined probe tip in the above embodiment is illustrated as extending along the axis of the fiber, the invention is not so limited. As illustrated in the cross-sectional view of FIG. 4, in some applications it may be advantageous to arrange the FIB milling to angle the probe tip 18 away from the axis of the conical fiber tip 14 of the fiber. Such an angled probe can be used, for example, to reach into deep corner holes or to measure reentrant sidewalls.

Figure 1:
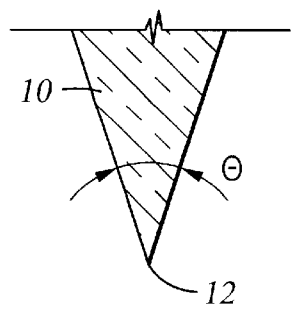
FIG. 1 is a cross-sectional view of a conical quartz tip used in fabricating one embodiment of a probe tip of the invention.
Figure 5:
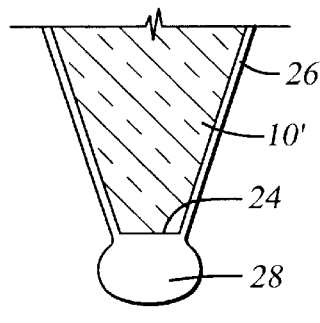
FIG. 5 is a cross-sectional view of shaped tip usable in forming yet another embodiment of a probe tip of the invention.
Figure 6:
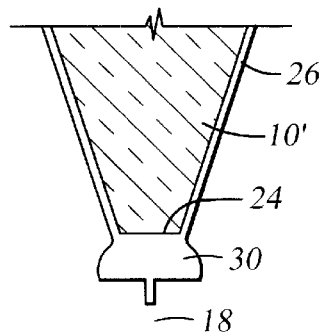
FIG. 6 is a cross-sectional view of the probe tip formed from the shaped tip of FIG. 5.

Glassy carbon and even diamond have characteristics promoting its use with another embodiment of the invention. Carbon based materials have been observed to preferentially deposit on the ends of relatively narrow flattened tips. As illustrated in the cross-sectional view of FIG. 5, the conical quartz tip of FIG. 1 is FIB milled or otherwise formed to have a shaped tip 10' with a relatively large flattened end 24, for example, having a diameter of 1 to 3 μm. Chemical vapor deposition of carbon under selected conditions causes the carbon to form as a thin uniform film 26 on the sloping sides of the shaped tip 10 but to form as a much thicker body 28 on the flattened tip end 24 having a thickness approximately equal to the width of the tip end 24. FIB milling is then used, as illustrated in the cross-sectional view of FIG. 6, to form the probe tip 18, for example having a length of 1 μm from the thicker body while leaving a wide support structure 30 of about the same depth. The support structure 30 may be also milled to reduce its width near the milled probe 18.

It is preferred that the wear resistant coating be formed over a tapered quartz fiber. Tapering techniques are well developed for quartz fiber, and optical fiber is relatively inexpensive. However, other glassy fibers can be used. The glassy structure reduces the possibility of polycrystalline grains having sizes larger than the desired tip.

The invention provides a sturdy but very small probe tip that can be easily and dependably manufactured by commercially available techniques.

What is claimed is:

1. A probe, comprising,
   a glassy body tapering along an axis to an end having an apex; and
   a layer of a material having a greater modulus of elasticity than said glassy body coated over said body having a tip machined in said layer adjacent to said apex.

2. The probe of claim 1, wherein said glassy body comprises quartz.

3. The probe of claim 2, wherein said material is selected from the group consisting of silicon nitride, silicon carbide, boron carbide, tungsten carbide, and amorphous carbon.

4. The probe of claim 2, wherein said material is selected from the group consisting of boron carbide, tungsten carbide, and amorphous carbon.

5. The probe of claim 1, wherein said tip has a tip longitudinal axis and wherein the tip longitudinal axis is not parallel to the axis of the glassy body.

6. The probe of claim 1, wherein said tip extends along said axis.

7. The probe of claim 1, wherein said tip has a length of at least 1 μm and a width of no more than 180 nm.

8. The probe of claim 1, wherein said glassy body has a generally conical shape.

9. The probe of claim 1, wherein said layer has a thickness of between 100 nm and 10 μm.

10. The probe of claim 9, wherein said thickness is between 500 nm and 5 μm.

11. The probe of claim 10, wherein said thickness is between 1 and 2 μm.

12. A method of fabricating a probe, comprising the steps of:
   providing a glassy body tapering along an axis to an end having an apex;
   coating said body with a layer of material; and
   machining a probe tip into said layer adjacent to said apex.

13. The method of claim 12, wherein said glassy body comprises quartz.

14. The method of claim 13, wherein said material is selected from the group consisting of silicon nitride, silicon carbide, boron carbide, tungsten carbide, and amorphous carbon.

15. The method of claim 13, wherein said material is selected from the group consisting of boron carbide, tungsten carbide, and amorphous carbon.

16. The method of claim 12, wherein said material has a modulus of elasticity larger than that of said glassy body.

17. The method of claim 12, wherein said machining comprises focused ion beam milling.

18. The method of claim 12, wherein said layer is deposited to a thickness of between 100 nm and 10 μm.

19. The method of claim 18, wherein said thickness is between 500 nm and 5 μm.

20. The method of claim 19, wherein said thickness is between 1 and 2 μm.

21. The method of claim 12, wherein said glassy body has a generally conical shape with an interior apex angle of between 10 and 35°.

22. The method of claim 12, wherein said apex is formed as a flat surface having a diameter of between 1 and 3 μm and wherein said coating step is performed under conditions producing a thicker film over said flat surface than over tapering sidewalls of said glassy body and wherein said machining step forms said probe tip in said thicker film.

23. The method of claim 22, wherein said material is selected from the group consisting of diamond and glassy carbon.

24. A probe for a scanning probe microscope, comprising:
   a probe body composed of a first material, the probe body tapering along an axis to form an end;
   a layer of a second material coated over said probe body, the second material having a modulus of elasticity greater than that of the first material; and
   a tip formed in said second material adjacent to said end and having a shape different from that of the layer as originally applied.

25. The probe of claim 24, wherein said probe body comprises quartz.

26. The probe of claim 24, wherein said end has a lateral dimension of 1 μm or less an said tip has a lateral dimension of 100 nm or less.

27. The probe of claim 24, wherein said tip has a length of at least 1 µm and a width of no more than 180 nm.

28. The probe of claim 24, wherein said tip has a tip longitudinal axis and wherein the tip longitudinal axis is not parallel to the axis of the probe body.

29. The probe of claim 24, wherein said material is selected from the group consisting of silicon nitride, silicon carbide, boron carbide, tungsten carbide, and amorphous carbon.

30. The probe of claim 24, wherein said layer has a thickness of between 100 nm and 10 µm.

31. The probe of claim 30, wherein said thickness is between 500 nm and 5 µm.

32. The probe of claim 31, wherein said thickness is between 1 and 21 µm.

33. A method of fabricating a probe, comprising the steps of:

providing a probe body composed of a first material, the probe body tapering along an axis to form an end; and coating said probe body with a second layer of material; and forming probe tip into said second layer adjacent to said end by removing material to leave a tip of desired shape.

34. The method of claim 33, wherein said second layer of material has a modulus of elasticity greater than that of the first material.

35. The method of claim 33, wherein said forming a probe tip comprises focused ion beam machining.

36. The method of claim 33, wherein said second layer of material is deposited to a thickness of between 100 nm and 10 µm.

37. The method of claim 36, wherein said thickness is between 500 nm and 5 µm.

38. The method of claim 37, wherein said thickness is between 1 and 2 µm.

39. The method of claim 33, wherein said probe body has a generally conical shape with an interior apex angle of between 10 and 35°.

40. The method of claim 33, wherein said end is formed as a flat surface having a diameter of between 1 and 3 µm, wherein said tapering probe body has sidewalls, wherein said coating step is performed under conditions producing a thicker film over said flat surface than over the sidewalls of said probe body, and wherein said machining step forms said probe tip in said thicker film.

* * * * *